United States Patent [19]
Pan-Ratzlaff

[11] Patent Number: 5,852,545
[45] Date of Patent: Dec. 22, 1998

[54] DETACHABLE ELECTRICAL AND MECHANICAL MOUNTING MECHANISM FOR SNAP MOUNTING COMPUTER SPEAKERS

[75] Inventor: Ruby Pan-Ratzlaff, Cedar Park, Tex.

[73] Assignee: Dell USA, L.P., Round Rock, Tex.

[21] Appl. No.: 891,059

[22] Filed: Jul. 10, 1997

Related U.S. Application Data

[63] Continuation of Ser. No. 449,180, May 24, 1995, abandoned.
[51] Int. Cl.[6] ....................................................... G06F 1/16
[52] U.S. Cl. ............................................... 361/683; 381/24
[58] Field of Search ......................... 248/918; 364/708.1; 312/7.1, 7.2, 8.1, 8.16; 181/141, 150, 199; 455/347–350; 381/90, 188, 24, 88, 189, 205; 348/836; 361/680–683

[56] References Cited

U.S. PATENT DOCUMENTS

| | | | |
|---|---|---|---|
| 3,943,564 | 3/1976 | Tushinsky | 381/24 X |
| 4,194,157 | 3/1980 | Uno | 455/348 |
| 4,450,495 | 5/1984 | Naruki | 455/350 X |
| 5,349,575 | 9/1994 | Park | 455/347 X |

OTHER PUBLICATIONS

"Sony Trinitron Color TV KV–20XBR/25XBR (Cable Compatible TV) Operating Instructions", copyright 1984, 20 pages.

*Primary Examiner*—Michael W. Phillips
*Attorney, Agent, or Firm*—Skjerven, Morrill, MacPherson, Franklin & Friel, L.L.P.; Stephen A. Terrile

[57] ABSTRACT

A computer system has a data processing unit, an audio speaker assembly apparatus, and at least one computer component mounting structure. The audio speaker assembly apparatus includes one or more speakers and one or more mounting mechanisms for electrically and mechanically connecting each speaker to the computer component mounting structure. Each speaker may be selectively and detachably connected to the computer component mounting structure so both an electrical connection of a speaker to the mounting structure and a physical support of the same speaker to the mounting structure can be readily established or removed. The computer component mounting structure may be, for example, as LCD housing or another type of display housing, or it may be a stationary mounting structure such as a docking station for docking portable notebook computers. The mounting mechanisms may comprise universal connectors for allowing any speaker to be mounted at any speaker mounting location on the computer component mounting structure. In addition, the mounting mechanisms may be provided with structure to allow the positioning and orientation of the speakers to be varied. The mounting mechanism allows the speakers to be snap mounted to a computer component mounting structure.

42 Claims, 10 Drawing Sheets ed to audio peripherals for computer systems. More particularly, the present invention relates to peripheral audio speakers which are easily handled, mounted and electrically coupled to a computer system.

DETACHABLE ELECTRICAL AND MECHANICAL MOUNTING MECHANISM FOR SNAP MOUNTING COMPUTER SPEAKERS

This application is a continuation of application Ser. No. 08/449,180, filed May 24, 1995, now abandoned.

FIELD OF THE INVENTION

The present invention is directed to audio peripherals for computer systems. More particularly, the present invention relates to peripheral audio speakers which are easily handled, mounted and electrically coupled to a computer system.

DISCUSSION OF BACKGROUND INFORMATION

Multimedia computers are gaining in popularity, and computers which produce high quality sounds are in demand. Apparently in order to meet this demand for high quality sounds, there has been an increase in the availability of audio components for PC computers, such as speakers, headphones, microphones, and sound cards.

Quality audio speakers are essential to producing quality sound from a computer-based sound output. Audio speakers for computers are typically small. Some are coupled to the computer by plugging external wires directly into a line-out jack on a sound card. Others are integrally mounted in a computer component mounting structure, for example, within a floppy disk external drive bay.

Connecting speakers to a line-out jack of a computer via external wires can be cumbersome, and time-consuming. Once the speakers are electrically connected, they must be physically mounted or placed somewhere within the working space surrounding the computer. Proper positioning of the speakers can be even more cumbersome and time-consuming in some situations.

An exemplary of a computer system with integrally-mounted audio speakers is the IBM Dock II notebook docking station for the THINKPAD notebook. The docking station comprises a pair of speakers integrally provided on each side of the docking station. Sound Mind Technology sells a Twin Sound stereo speaker system which is mounted within a PC 5 and ¼ inch external drive bay. In computer systems with integrally mounted speakers, the directions in which the speakers face are typically fixed, and the size of each speaker is limited, which can limit the quality of the sound produced therein. In addition, the distance between stereo speakers is limited, reducing the perceived stereo effect produced. Integral speaker systems are further limited because the speakers cannot be readily detached.

Terms Used Herein

For purposes of clarification, and to assist readers in understanding the present invention, the following terms are defined:

Audio Speaker—an electro-acoustic device that converts electrical energy into humanly audible sound energy.

Computer Component Mounting Structure—a mounting structure for holding one or more key computer components including, for example, display circuitry, input/output devices, processing units, and memory storage devices. Some exemplary computer component mounting structures include a notebook docking station, a computer display housing for housing a display such as an LCD or monitor, and a keyboard/main body housing of a notebook computer.

Music-Quality Audio Speaker—an audio speaker with a frequency response range which typically covers from 100 Hz to 20,000 Hz. A high-end music-quality speaker may be defined as having a frequency response range of from 30 Hz to 23,000 Hz.

Portable Computer—A computer formed of a unitary structure including a processor, an input-output device, and a display device. A portable computer has a low weight, of 20 pounds or less, to facilitate carrying of the same. Some examples of portable computers include notebook computers, sub-notebook computers, and personal digital assistants (PDAs).

Stationary-Type Computer—a computer primarily intended for stationary use. Some exemplary stationary-type computers include a desktop computer, a work station, a server, and a computer system comprising a portable computer docked in a docking station coupled to a monitor and an input/output device.

SUMMARY OF THE INVENTION

In view of the above, the present invention, through one or more of its various aspects and embodiments, is thus presented to bring about one or more objects and advantages, such as those noted below.

An object of the present invention is to provide a simple, elegant add-on speaker arrangement for use in computer systems in general where the speaker arrangement is particularly well-suited to portable computers. The present invention strives to provide a flexible and less cumbersome alternative to existing speaker arrangements for stationary-type and portable computers.

Accordingly, it is an object of the present invention to provide a computer system with a simple-to-use speaker arrangement. More specifically, it is an object of the present invention to provide such a speaker arrangement which is separate and independent of a computer, and which has means for mounting the arrangement to a portion of the computer as needed.

A further object of the present invention is to provide a detachable mounting mechanism for readily physically supporting speakers on a computer component mounting structure and for concurrently electrically connecting the speakers to a computer's sound output.

An additional object of the present invention is to provide an add-on speaker arrangement that can be equally connected to a stationary-type computer system or to a stationary docking system for portable computers.

Another object of the present invention is to provide a mechanism for connecting add-on speakers to a computer system while allowing adjustment of the positions of the speakers. In accordance with a particular aspect of the invention, a mounting location of each speaker may be varied, and the direction in which each speaker faces may be varied.

Another object is to provide a speaker arrangement comprising a plurality of speakers with universal mounting mechanisms for mounting each speaker to any desired speaker mounting location on a computer component mounting structure.

The present invention, therefore, is directed to a combination computer system having a data processing unit, an audio speaker assembly apparatus, and at least one computer component mounting structure. The present invention is further directed to one or more sub-combinations of such a computer system. The audio speaker assembly apparatus includes at least one speaker and mounting mechanisms for electrically connecting each speaker to a corresponding computer component mounting structure and for concurrently physically supporting each speaker on the same computer component mounting structure. The mounting mechanisms are provided with structure for selectively and readily establishing and removing both an electrical connection of a speaker to a mounting structure and a physical support of a speaker on a mounting structure. The speakers may comprise either music-quality or high-end music-quality speakers.

In accordance with a particular aspect of the computer system, the mounting mechanism comprises base connector means provided on the at least one computer component mounting structure, and peripheral connector means provided on the at least one speaker. The base connector means includes a base mating structure, and the peripheral connector means includes a peripheral mating structure complimentary to the base mating structure.

In accordance with a further aspect of the present invention, the base connector means and peripheral connector means collectively comprise means for resting at least part of the weight of the at least one speaker on the at least one computer component mounting structure. In addition, the base connector means and the peripheral connector means may each comprise complimentary electrical contacts arranged to electrically contact each other with matching polarity when the base mating structure is fully mated with the peripheral mating structure.

The electrical contacts of the peripheral connector means may be arranged so that they continue to compliment and properly correspond in polarity to the electrical contacts of the base connector means when an orientation of the peripheral connector means is changed by a certain amount relative to an orientation of the base connector means. The amount of change in orientation of the peripheral connector means may comprise a 180 degree rotation about a point at which the peripheral connector means contacts the base connector means.

In accordance with a further aspect of the present application, the at least one computer component mounting structure is provided with a plurality of speaker mounting locations, and the base connector means is provided with a base connector at each of the speaker mounting locations. Each base connector may comprise a similar base mating structure and a similar arrangement of electrical contacts, so that a speaker may be detachably mounted to any speaker mounting location on a computer component mounting structure.

In accordance with another aspect of the present invention, the at least one computer component mounting structure may comprise a single mounting structure having a plurality of speaker mounting locations. The single mounting structure may comprise a computer display housing. The computer display housing may be a display housing of a portable computer. Speaker mounting locations may be provided at each of two lateral sides of the display housing.

In accordance with another aspect of the present invention, the computer component mounting structure may comprise a stationary mounting structure for housing a computer processing system. The stationary mounting structure may specifically comprise a docking station for docking a portable computer such as a notebook or sub-notebook computer. The speaker mounting locations may be on a top surface of such a docking station.

In accordance with another aspect of the present invention, the mounting mechanism may comprise a device for electrically connecting input terminals of a speaker to sound output terminals of a computer and for concurrently mechanically mounting the speaker to the at least one computer component mounting structure.

In accordance with a further aspect of the present invention, the mounting mechanisms may have position-varying means for varying a position of each mounted speaker relative to the at least one computer component mounting structure. The position varying means may comprise a mechanism for changing an orientation of a mounted speaker without changing a mounting location of the mounted speaker on the computer component mounting structure. The position-varying means may comprise, e.g., a hinge or a turn-table.

The above-listed and other objects, features, and advantages of the present invention will be more fully set forth hereinafter.

BRIEF DESCRIPTION OF THE DRAWINGS

The present invention is further described in the detailed description that follows, by reference to a plurality of drawings by way of non-limiting examples of exemplary embodiments of the present invention, wherein like reference numerals in the drawings representing similar parts throughout the several views of the same, and wherein.

DETAILED DESCRIPTION OF THE EXEMPLARY EMBODIMENTS

Figure 1:
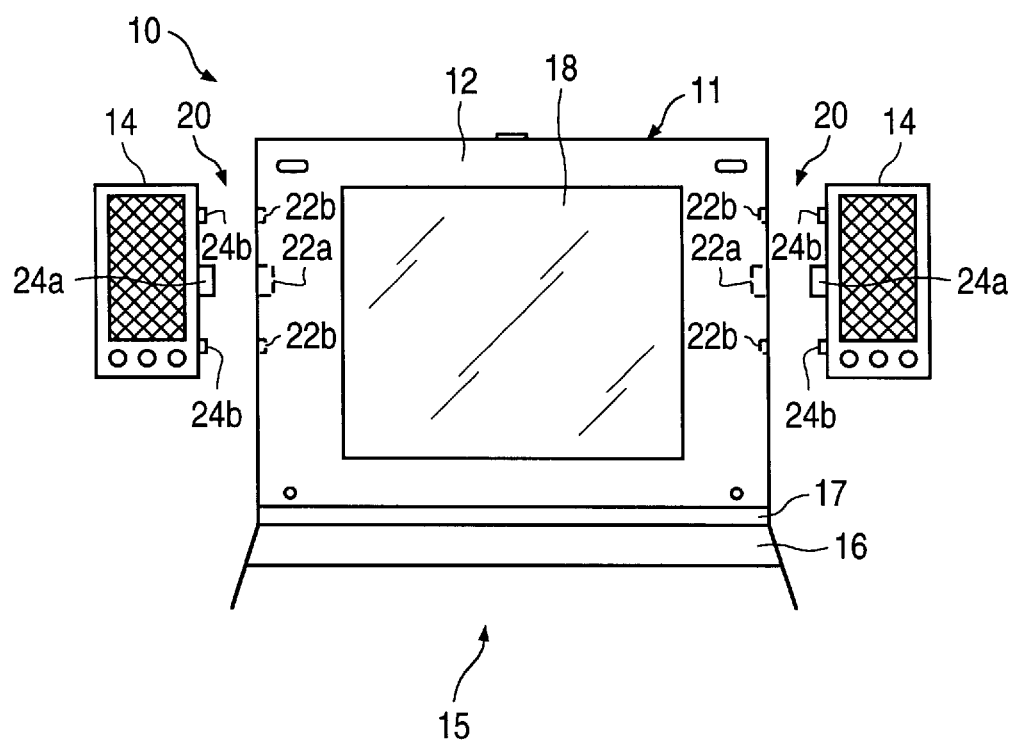
FIG. 1 is a front elevated view of a first embodiment computer system, with a computer display, a speaker mounting mechanism, and a pair of speakers in alignment for ready mounting to the computer display.

Referring now to the drawings in greater detail FIG. 1 is a front elevated view of a first embodiment of a computer system 10. In the illustrated embodiment, computer system 10 comprises a notebook computer 15 having a computer display device 11 connected to a keyboard/main body 16 via a hinge 17. Computer display device 11 comprises a computer display housing 12, which serves as a computer component mounting structure, and an LCD (liquid crystal display) 18. The illustrated computer system 10 also includes a pair of speakers 14. Mounting mechanisms 20 are provided for electrically connecting speakers 14 to computer display housing 12, and for concurrently physically supporting speakers 14 on lateral side portions of computer display housing 12.

Each illustrated mounting mechanism 20 comprises a base connector 22 provided on computer display housing 12 and a peripheral connector 24 provided on side panels of speakers 14. Each base connector 22 may comprise a main electromechanical base mating structure 22a and an (optional) supplemental mechanical base mating structure 22b. Each peripheral connector 24 may comprise an electro-mechanical peripheral mating structure 24a which is complementary to electro-mechanical base mating structure 22a, and an (optional) supplemental mechanical peripheral mating structure 24b.

Electro-mechanical base mating structure 22a and electro-mechanical peripheral mating structure 24a may be detachably mated with each other. More specifically, each of the mating structures is configured to allow both an electrical connection of each speaker 14 to computer housing 12 and a physical support of each speaker 14 by computer housing 12 to be selectively and readily established or removed.

Figure 2:
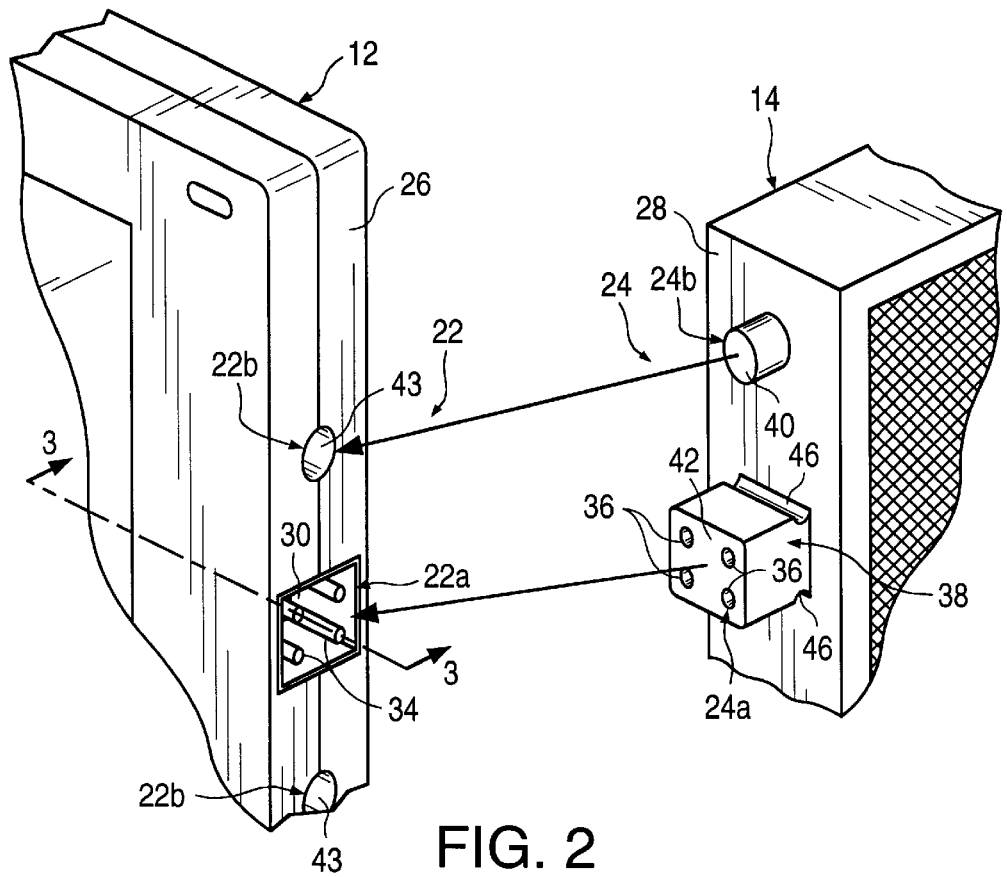
FIG. 2 is a perspective view of a computer display in relation to a speaker, illustrating a speaker mounting mechanism in more detail.
Figure 3:
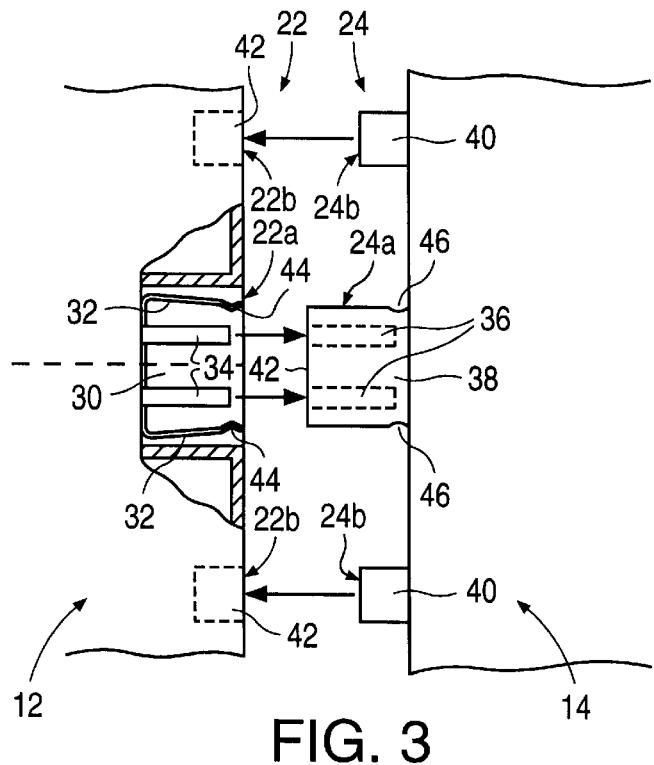
FIG. 3 is a sectional view of a computer display in alignment with a speaker for ready mounting to the computer display, the view being defined by the viewing plane line 3—3 shown in FIG. 2.

As shown in FIGS. 2 and 3, a computer component mounting structure (a notebook LCD display in the particular illustrated embodiment) 12 and a speaker 14 are each provided with complementary connectors for selectively and readily establishing and removing both an electrical connection between them and a physical support of the speaker by the computer component mounting structure 12. In the embodiment illustrated in FIGS. 2 and 3, a computer display housing 12 is provided with a base connector 22 on a lateral side panel 26 of computer display housing 12: and a peripheral connector 24 is provided on a lateral side panel 28 of a speaker 14. Base connector 22 is shown as comprising base connector mechanisms 22a and 22b. More particularly, base connector 22 comprises an electro-mechanical base mating structure 22a and a plurality of supplemental mechanical base mating structures 22b. Electro-mechanical base mating structure 22a specifically comprises, in the illustrated embodiment, a box-shaped recess 30, a retention spring 32, and electrical contact pins 34.

Peripheral connector 24 comprises an electro-mechanical peripheral mating structure 24a and (optional) supplemental mechanical peripheral mating structures 24b. Supplemental mechanical peripheral mating structures 24b may comprise, as illustrated in FIGS. 2 and 3, male-type cylindrical-shaped protrusions. Electro-mechanical peripheral mating structure 24a comprises a box-shaped fitting member 38 which has a plurality of electrical contact recesses 36, each having access openings exiting on a leading surface 42 of fitting member 38.

Peripheral mating structures 22a, 22b are generally complementary in size, pattern, and arrangement to base mating structures 22a, 22b, so that speaker 14 can be selectively and readily electrically connected to and physically supported by computer display housing 12. When mounting speaker 14 to computer display housing 12, each box-shaped fitting member 38 and male cylindrical protrusions 40 is respectively inserted into a complementary and corresponding box-shaped recess 30 and a cylindrical recess 43 provided within a side panel 26 of computer display housing 12. As base connector 22 is mated with peripheral connector 24 in this manner, electrical contact pins 34 enter the access openings of electrical recesses 36. When base connector 22 is fully mated with peripheral connector 24, each electrical contact pin 34 makes complete electrical contact with a respective electrical contact recess 36.

Retention spring 32 acts together with box-shaped fitting member 38 to form a readily detachable, but physically secure, connection between speaker 14 and computer display housing 12, so that the weight of speaker 14 is adequately supported by computer display housing 12, and a complete electrical connection is maintained between electrical contact pins 34 and electrical contacts recesses 36. Therefore, as box-shaped fitting member 38 is inserted into box-shaped recess 30, gripping ends 44 of retention spring 32 maintain contact with and glide along top and bottom flat surfaces of box-shaped fitting member 38 until box-shaped fitting member 38 is completely inserted into box-shaped recess 30. At that time, gripping ends 44 will move into a locking position abutting locking recesses 46. Of course, it should be understood by one skilled in the art that alternative means of retention may be used without departing from the spirit and scope of the present invention.

As noted previously, base connector 22 and peripheral connector 24 may each optionally comprise supplemental mechanical base mating structures, 22b and 24b. The supplemental mechanical base mating structures when filly mated with each other, further secure the position of speaker 14 in relation to computer display housing 12 when the two devices are connected to each other. Specifically, if supplemental mechanical base mating structures are provided, a fully-mounted speaker 14 will better resist torsional forces in all directions.

Base connector 22 and peripheral connector 24 may each be integrally formed as part of the respective side panels of computer display housing 12 and speaker 14. For example, box-shaped fitting member 38 and male cylindrical protrusions 40 may be integrally formed as part of side panel 28 of speaker 14, e.g., with plastic using a known injection-molding process. In addition, box-shaped recess 30 and cylindrical recesses 43 may each comprise wall surfaces which are integral extensions of the outer side surface of side panel 26 of display housing 12. These inner recess walls may similarly be formed of plastic together with the panels of computer display housing 12 utilizing a known injection-molding process. Of course, the protrusions and recesses of peripheral connector 24 and base connector 22 may be formed in any suitable manner so long as they perform their essential electrical and mechanical connections as described herein.

The electrical contacts of each base connector 22 and peripheral connector 24 may be implemented with any suitable well-known electrical coupling mechanism. In the example illustrated in FIGS. 2 and 3, a specific pattern of electrical contact pins 34 and electrical contact recesses 36 is utilized. The pattern includes four electrical contact pins 34 and four corresponding and complementary electrical contact recesses 36. The pins and recesses are arranged in a rectangular pattern, with each contact being placed at a particular corner of the rectangular pattern. The present invention does not preclude the use of other types of electrical connector mechanisms in base connector 22 and peripheral connector 24 so long as the base connector and the peripheral connector each comprise complementary contacts arranged to electrically contact each other with matching polarity when the base mating structures are fully mated with the peripheral mating structures.

The pattern of electrical contacts illustrated in FIGS. 2 and 3 provides specific benefits to the speaker assembly apparatus of the present invention. Particularly, the electrical contacts of peripheral connector 24 are arranged so that they continue to complement, and properly correspond in polarity to, electrical contacts of base connector 22 when an orientation of the peripheral connector 24 is changed by a certain amount relative to the orientation of base connector 22. More specifically, the speaker may be inverted so that peripheral connector 24 is inverted. Even when peripheral connector 24 is inverted, its electrical contacts will still complement and properly correspond in polarity to the electrical contacts of base connector 22.

Figure 13:
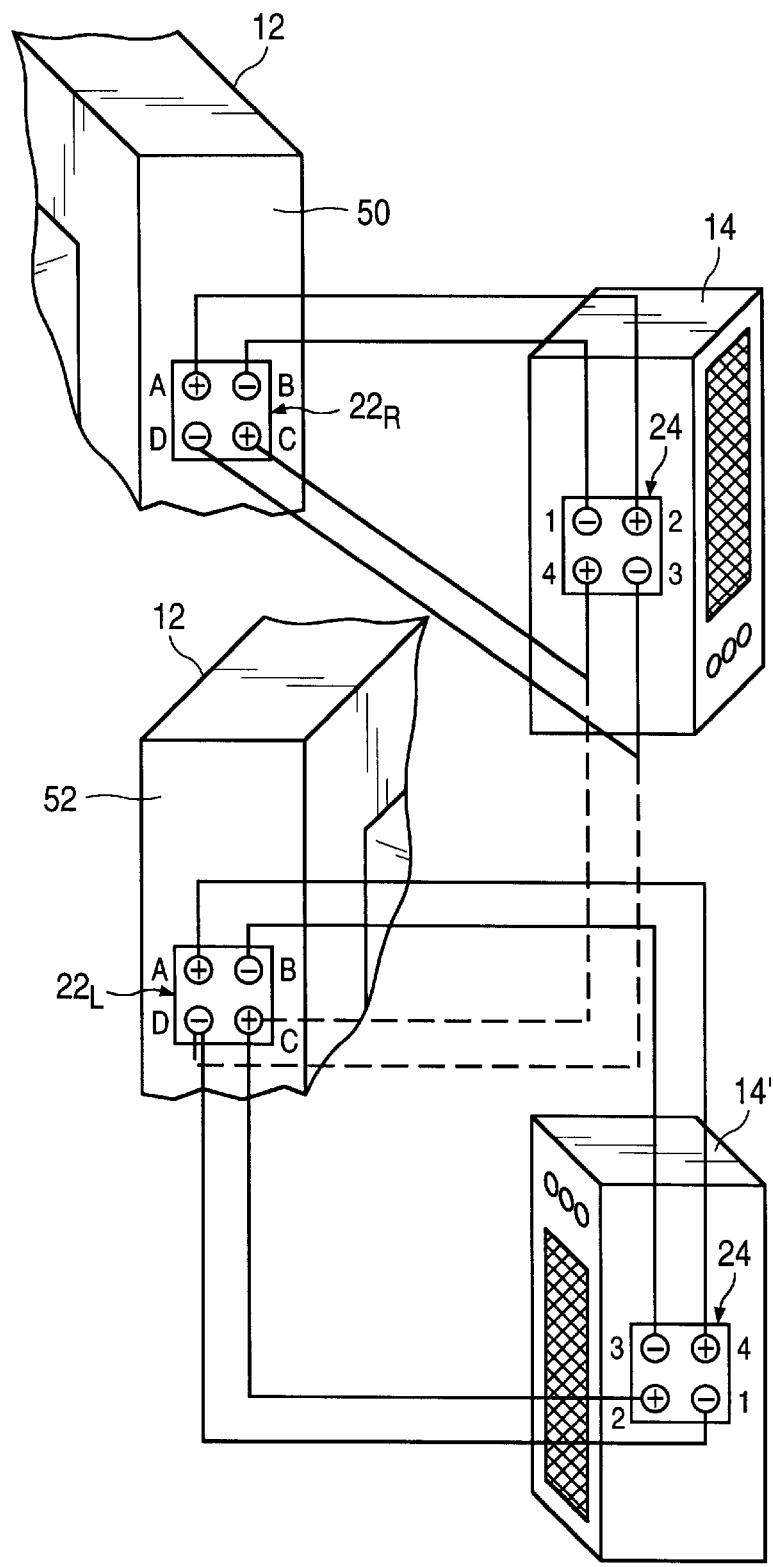
FIG. 13 provides several partial perspective views of a speaker and a display housing, each view having schematic representations of the polarities of electrical connectors provided in each connector mechanism.

FIG. 13 provides a plurality of perspective views of cut-away portions of a computer display housing 12 and a speaker. More specifically, FIG. 13 includes perspective views of a right side panel 50 of a display housing 12, a left side panel 52 of display housing 12, an upright speaker 14 and an inverted speaker 14'. Up-right speaker 14 may be connected to right side panel 50 of display housing 12 as shown, with the electrical contacts of peripheral connector 24 coming into contact with corresponding complementary electrical contacts of a right-side base connector $22_R$. More specifically, when an up-right speaker 14 is connected to right side panel 50 of display housing 12, peripheral contact 1 having a negative polarity is mated with base contact B also having a negative polarity. Similarly, peripheral contact 3 having a negative polarity is mated with base contact D also having a negative polarity. The remaining positive polarity peripheral contacts 2, 4 are mated with base contacts A, C which also have positive polarities.

Inverted speaker 14' may also be connected to right side panel 50 of display housing 12, by connecting peripheral connector 24 (the same connector, now inverted) with right-side base connector $22_R$. Even though the speaker is inverted, it's pattern of polarities remains the same, and the polarities still match those of right-side base connector $22_R$ when connected. More specifically, peripheral contacts 3, 4, 2, and 1 will respectively correspond in polarity to base contacts A, B, C and D.

A speaker 14 may be inverted, as is inverted speaker 14', and connected to the same right-side base connector $22_R$. In addition, a speaker 14 may be connected (upright or inverted) to another left-side base connector $22_L$ on a left side panel 52 of display housing 12. If upright speaker 14 is connected to left-side panel 52, it will face in a direction away from the computer's user. If an inverted speaker 14'is connected to left side panel 52 of display housing 12, it will face toward the computer's user. The specific connector arrangement illustrated in FIG. 13 is non-polarized (Le., universal) so that a user may plug a speaker into a base connector provided on a computer display housing 12 without concern as to whether the speaker 14 is upright or inverted. In addition, each speaker 14 may be connected to either of a plurality of base connectors 22.

Speakers 14 may be mounted at various mounting locations on a computer component mounting structure. The computer component mounting structure need not be a computer display housing 12 as illustrated in FIGS. 1–3 and 13. Rather, the computer component mounting structure may comprise other structures such as a docking station for portable notebook computers, a keyboard/main body of a notebook computer, and a main body of a stationary-type computer. The computer component mounting structure may be provided with a plurality of speaker mounting locations, with a base connector provided at each of the speaker mounting locations. In the first embodiment computer system 10 illustrated in FIGS. 1–3, an LCD display 18 is utilized as the computer component mounting structure, and it has two speaker mounting locations, one at each side panel of the display housing.

Figure 4:
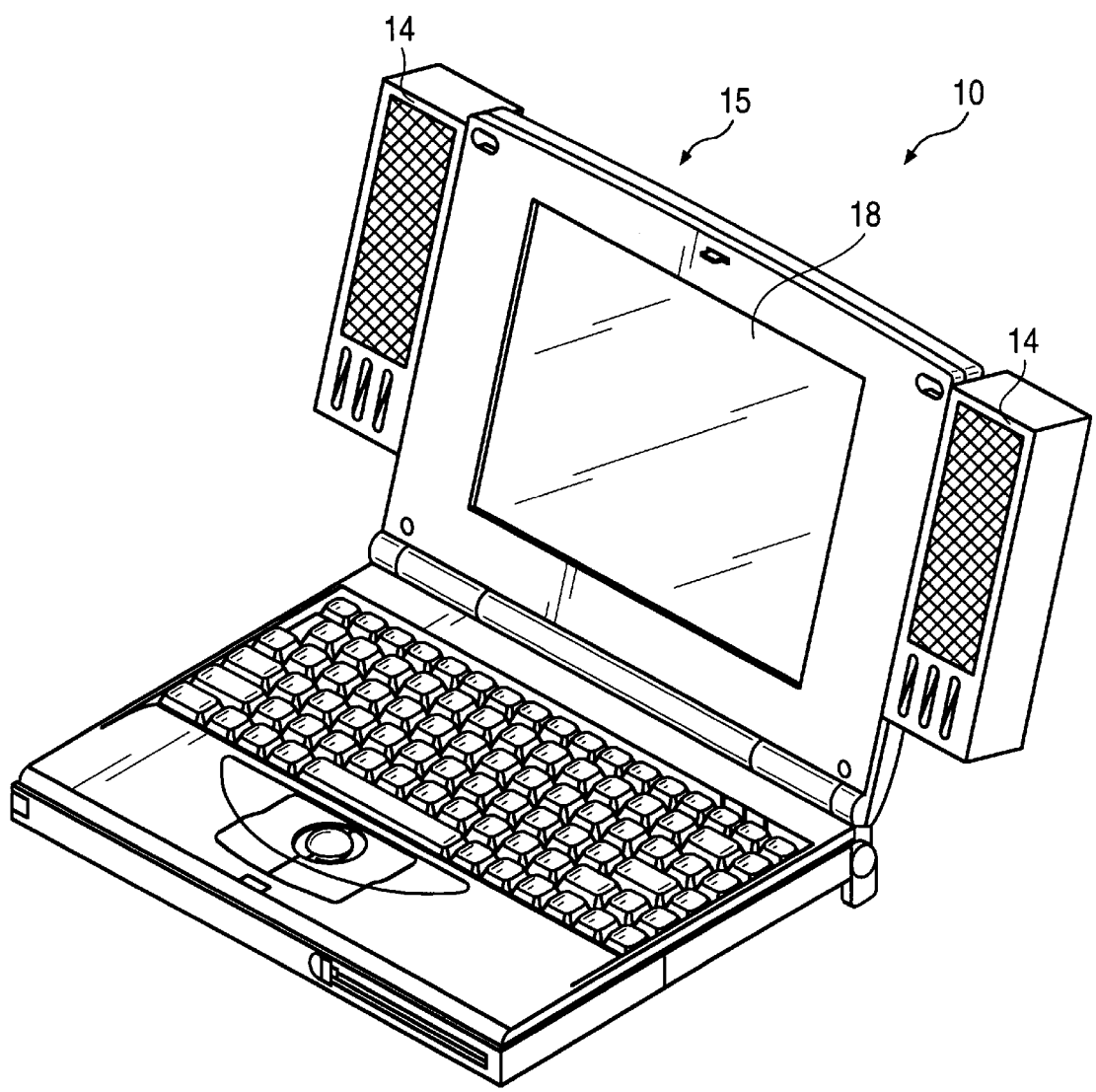
FIG. 4 is a perspective elevated view of a notebook computer with speakers attached to lateral sides of an LCD housing.

FIG. 4 is a perspective elevated view of a notebook computer 15, with a pair of speakers 14 detachably snap-mounted to a side panel of an LCD 18. Notebook computer 15 together with speakers 14 form a computer system 10. The set of speakers 14 serves as a speaker arrangement for portable computers such as notebook computer 15, and may be sold as a set to be detachably mounted to any computer component mounting structure which has the appropriate base connectors for receiving and mating with the peripheral speakers 14. There are several advantages to the speaker arrangement set of FIG. 4 in the context of notebook computers. Notebook computers are typically used in limited environments in which it is difficult to set up the computer for use. The user's environment may have physical limitations, for example, when the user is traveling in an airplane or train, or time limitations, for examples when the user is in a boardroom meeting and time is of the essence. The mounting mechanisms of the present invention allow the user to quickly set up a speaker arrangement, even when there are major space limitations.

Presently available speaker systems that use external wires to connect to a notebook computer present the traveling user with difficulties in, e.g., removing a speaker and unwrapping wires to connect the same to a notebook computer. Such speaker systems also present the time-conscious user with difficulties because of the extra time it takes to unwrap speakers and connect speaker wires to a notebook computer.

In each of the exemplary embodiments described herein, the mounting mechanisms, including base connectors and peripheral connectors, allow the position of each mounted speaker to be varied relative to the computer component mounting structure. Some embodiments such as the first embodiment illustrated in FIGS. 1–3, allow the position of mounted speakers to be varied by simply changing the orientation of the speaker (e.g., inverting the position of the speaker) and thereby causing the speaker to face in a different direction, or by switching the speaker from one mounting location to another. FIGS. 5–9 illustrate a second embodiment computer system 10 having a computer component mounting structure 12, speakers 14, and mounting mechanisms 20, which together allow gradual adjustment of the direction in which each speaker is facing. More specifically, the embodiment of FIGS. 5–9 includes an exemplary speaker pivot mechanism 56 which allows each speaker 14 to be pivoted about a pivot axis.

Figure 5:
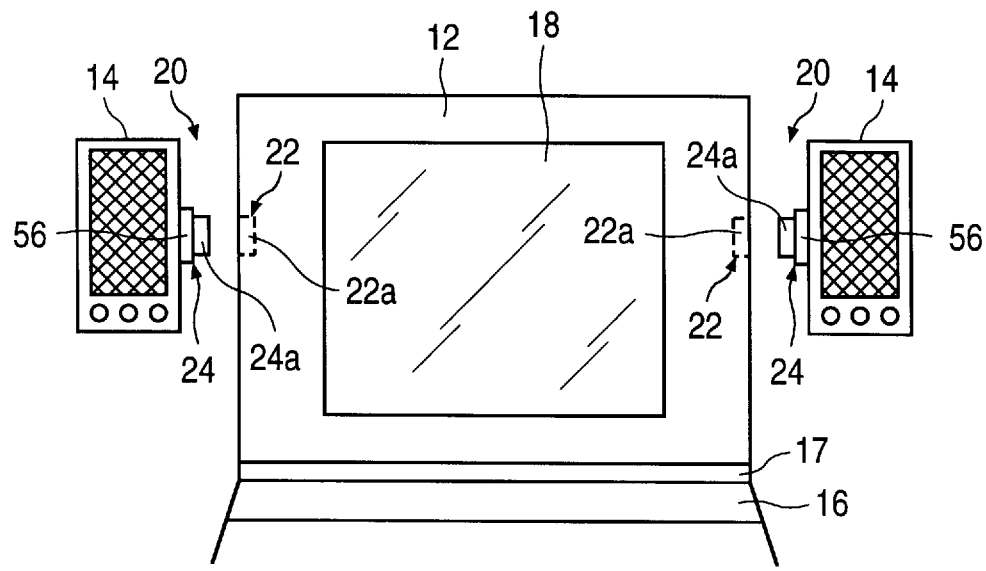
FIG. 5 is a front elevated view of a second embodiment computer system with a computer display, a speaker mounting mechanism, and a pair of speakers in alignment for ready mounting to the computer display.

FIG. 5 is a front view of a computer display housing 12 and a pair of speakers 14. Computer display housing 12 comprises an LCD display 18 of a notebook computer 15. Notebook computer 15 further comprises a keyboard/main body 16, which is connected to computer display housing 12 via a hinge-mechanism 17. A pair of speakers 14 is show in FIG. 5. Each speaker may be detachably mounted, thereby establishing both an electrical connection and a physical support, to computer display housing 12. In order to mount a speaker 14 to display housing 12, mounting mechanisms 20 are provided. Each mounting mechanism 20 comprises a base connector 22 and a peripheral connector 24. Each base connector 22 comprises an electromechanical base mating structure 22a, and each peripheral connector 24 comprises an electromechanical peripheral mating structure 24a which is complimentary to the base mating structure 22a.

Each mounting mechanism 20 is further provided with a speaker pivot mechanism 56, which, in the illustrated example, comprises a hinge provided as a part of peripheral connector 24.

Figure 6:
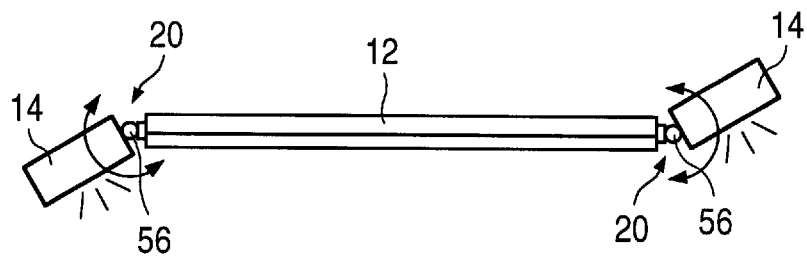
FIG. 6 is a top view of the computer system shown in FIG. 5.

FIG. 6 provides a top view of a computer display housing 12, with a pair of speakers 14 detachably mounted thereto. Each speaker 14 is connected via a mounting mechanism 20, and each mounting mechanism 20 includes a speaker pivot mechanism 56 which facilitates movement of each speaker 14 in the direction of the arrows shown in FIG. 6. As can be seen in FIG. 6, as the position of each speaker 14 is varied utilizing a speaker pivot mechanism 56, the direction in which each speaker is facing can be adjusted. More particularly, the azimuthal orientation of each mounted speaker can be gradually adjusted by simply pivoting each speaker 14 about a vertical pivot axis.

Figure 7:
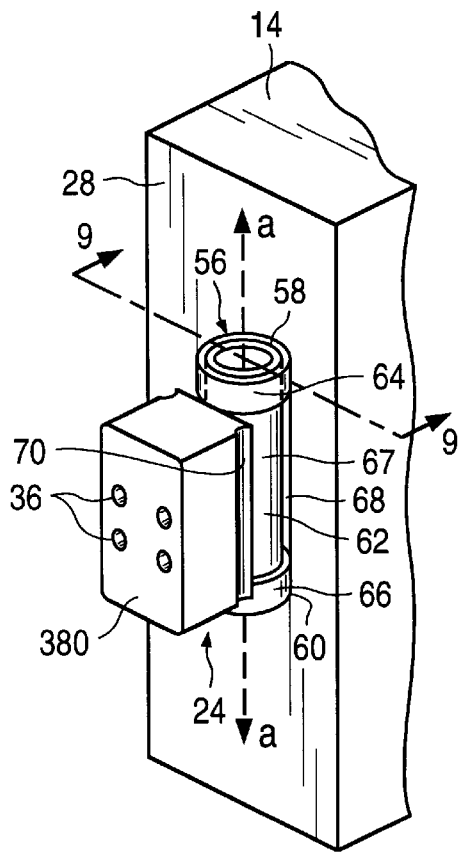
FIG. 7 is a close-up perspective view of a peripheral connector mechanism provided on a side panel of a speaker.
Figure 8:
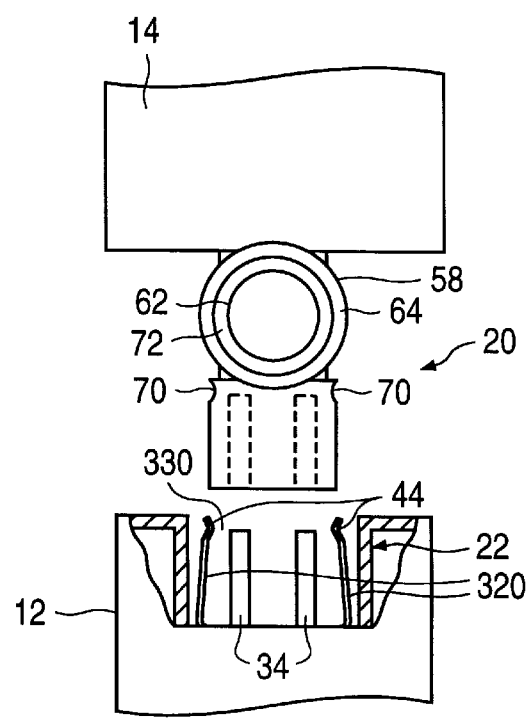
FIG. 8 is a top view of cut-away portions of a speaker and a computer display, with a peripheral connector mechanism shown in alignment for ready mating with a base connector mechanism.
Figure 9:
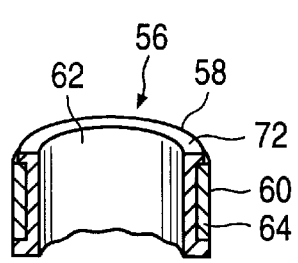
FIG. 9 is a sectional view of a top portion of a hinge, the view being defined by the viewing plane line 9—9 shown in FIG. 7.

FIGS. 7–9 illustrate various specific features of an exemplary mounting mechanism 20 having a hinge-type speaker pivot mechanism. FIG. 7 provides a perspective view of a speaker 14 having a peripheral connector 24, where the peripheral connector 24 comprises the speaker pivot mechanism 56. FIG. 8 provides a top view of a speaker 14 in position for readily and detachably mounting the speaker to a computer component mounting structure, I.e., a computer display housing 12. FIG. 9 provides a sectional view of a top portion of a hinge 58, defined by a viewing plane line 9—9 shown in FIG. 7.

Peripheral connector 24 may comprise, as illustrated in FIGS. 7 and 8, a speaker pivot mechanism 56 comprising a hinge 58 connected between a side panel 28 of speaker 14 and a box-shaped fitting member 380. Hinge 58 and box-shaped member 380 together form a peripheral connector 24 configured for being matably connected to a corresponding base connector 22 provided on computer display housing 12 as shown in FIG. 8. Hinge 58 comprises an annular hinge support housing 60 which is fixed in relation to side panel 28 of speaker 14, and a rotatable cylindrical inner member 62 movably supported by annular hinge support housing 60. Annular hinge support housing 60 comprises a top ring portion 64 for rotatably supporting a top portion of cylindrical inner member 62, and a bottom ring portion 66 for rotatably supporting a bottom portion of cylindrical inner member 62. Top ring portion 64 is connected to bottom ring portion 66 via a spine member 68 which runs vertically along side panel 28 of speaker 14. Top and bottom ring portions 64. 66, and spine member 68 together define a frontal opening 67. Cylindrical inner member 62 may be freely rotated about a vertical center axis a—a thereby allowing box-shaped fitting member 380, which is secured to cylindrical inner member 62, to be pivoted about the same vertical pivoting axis.

Box-shaped fitting member 380 may be similar in shape and configuration to box-shaped fitting member 38 of the first embodiment illustrated in FIGS. 1–3. However, it is shown in FIGS. 7 and 8 as being slightly longer in the vertical direction in order to provide additional support to speaker 14 when it is mounted to computer component mounting structure. In addition, box-shaped fitting member 380 comprises vertically arranged locking recesses 70 at each side of the fitting member 380, at a location adjacent to the point at which box-shaped fitting member 380 is fixed to cylindrical inner member 62. Alternatively, or in addition, box-shaped fitting member 380 may be provided with horizontal locking recesses 46 as illustrated in FIGS. 2 and 3. Any appropriate retaining mechanism may be provided as long as it can securely hold speaker 14 to the computer component mounting structure.

Referring to the specific example illustrated in FIG. 8, as box-shaped fitting member 380 is engaged with base connector 22, gripping ends 44 contact the respective sides of box-shaped fitting member 380, and terminate within vertical locking recesses 70 once box-shaped member 380 is fully mated with the box-shaped recess 330. When the connectors are completely mated, electrical contact pins 34 will be fully mated with electrical contact recesses 36, thereby forming electrical contacts between speaker 14 and a computer sound output (not shown in FIGS. 7–9).

FIG. 9 is a sectional view of top portions of annular hinge support housing 60 and cylindrical inner member 62, which together form a hinge 58. Cylindrical inner member 62 preferably has a smooth outer cylindrical surface, and is rotatably supported within annular hinge support housing 60. Annular hinge support housing 60 comprises a top ring portion 64 and a bottom ring portion 66 (not shown in FHg. 9). Cylindrical inner member 62 may be freely supported in the vertical direction by the use of a flange 72 resting upon a top surface of top ring portion 64. A similar flange (not shown) may be provided at a bottom of cylindrical inner member 62 for freely interacting with a bottom edge surface of a bottom ring portion 66 of annular hinge support housing 60. Any other appropriate structure, other than flange 72, may be used to vertically support cylindrical inner member 62. For example, a C-ring may be provided within an annular recess provided at a top end of cylindrical inner member 62 and may rest upon the top edge of top ring portion 64. Similarly, a C-ring may be provided at a bottom end of cylindrical inner member 62 and abut against a bottom edge of bottom ring portion 66 of annular hinge support housing 60.

Each element of the overall mounting mechanism 20 illustrated in the embodiment of FIGS. 7–9 may be formed of any suitable material sufficiently resilient and rigid to perform the elements intended function. For example, the various elements may be formed with injection-molded hard and resilient plastic material or with a suitable metallic alloy.

Figure 10:
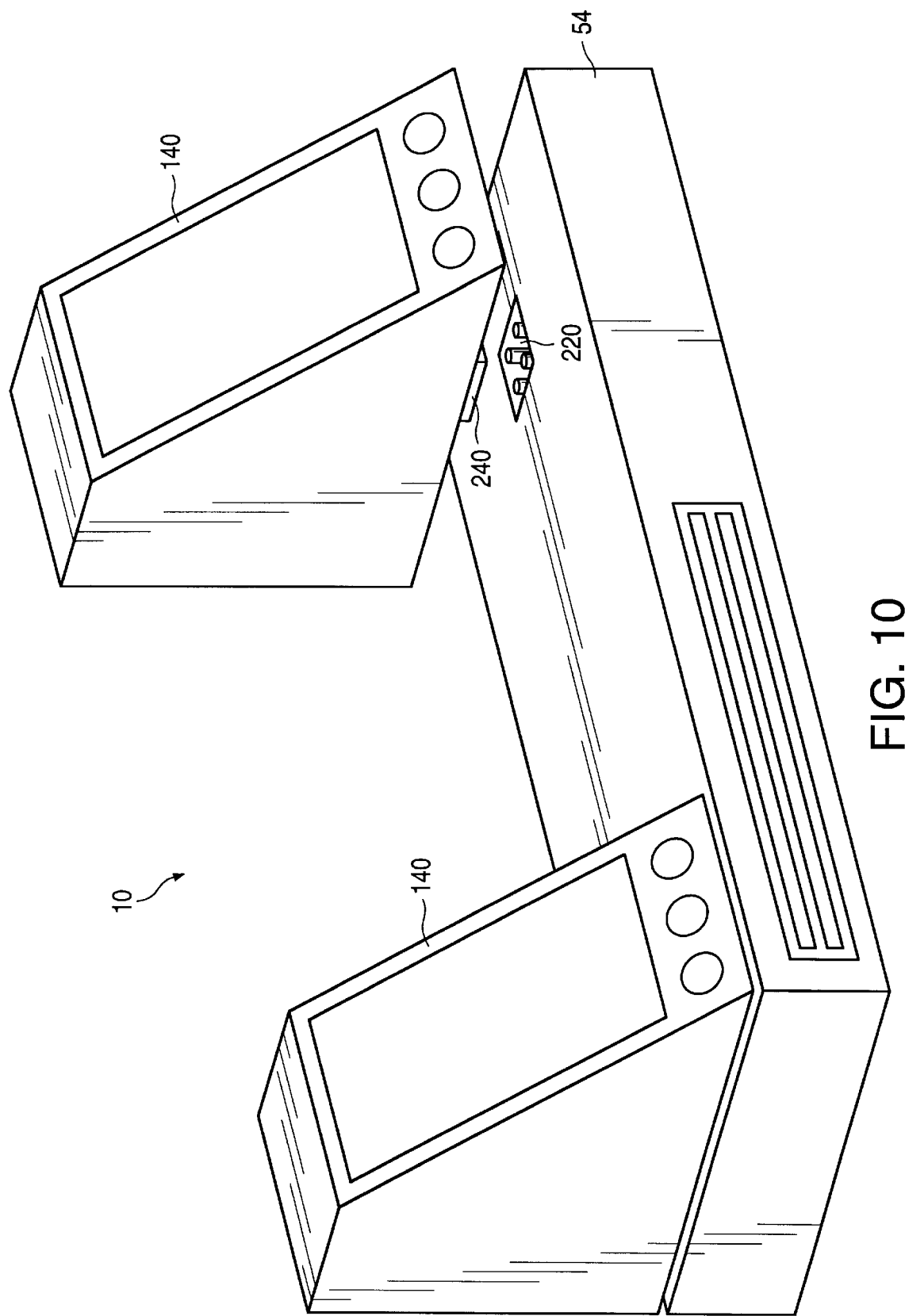
FIG. 10 is an elevated perspective view of a third embodiment computer system with a stationary computer component mounting structure, a speaker mounting mechanism, and a pair of speakers.

FIG. 10 illustrates a third embodiment computer system 10 having a pair of speakers 140 mounted at two respective mounting locations provided on a top surface of a docking station 54. Each speaker 140 may be provided with a peripheral connector 240, and docking station 54 may be provided with a base connector 220 located at each speaker mounting location. In the illustrated example, base connector 220 and peripheral connector 240 can be implemented in substantially the same way as the connector mechanisms illustrated in FIGS. 1–3. More particularly, base connector 220 can have a configuration similar to electro-mechanical base mating structure 22a, and peripheral connector 240 can have a configuration similar to electro-mechanical peripheral mating structure 24a as illustrated in FIGS. 1–3. Because speakers 140 are mounted on a top surface of docking station 54, supplemental mechanical supports are not provided in this embodiment.

Base connector 220 and peripheral connector 240 may further be provided with universal electrical connector patterns similar to those provided in the first embodiment of FIGS. 1–3, so that the speakers may be turned to face opposite directions or be relocated from one mounting location to another on docking station 54.

The specific illustrated example provided in FIGS. 7–9 provides a speaker pivot mechanism 56 which pivots speakers 14 about a vertical axis which is fixed with respect to a computer component mounting structure, such as a computer display housing 12. Other types of pivoting mechanisms may be provided, and may be integrated into a mounting mechanism 20.

Figure 11:
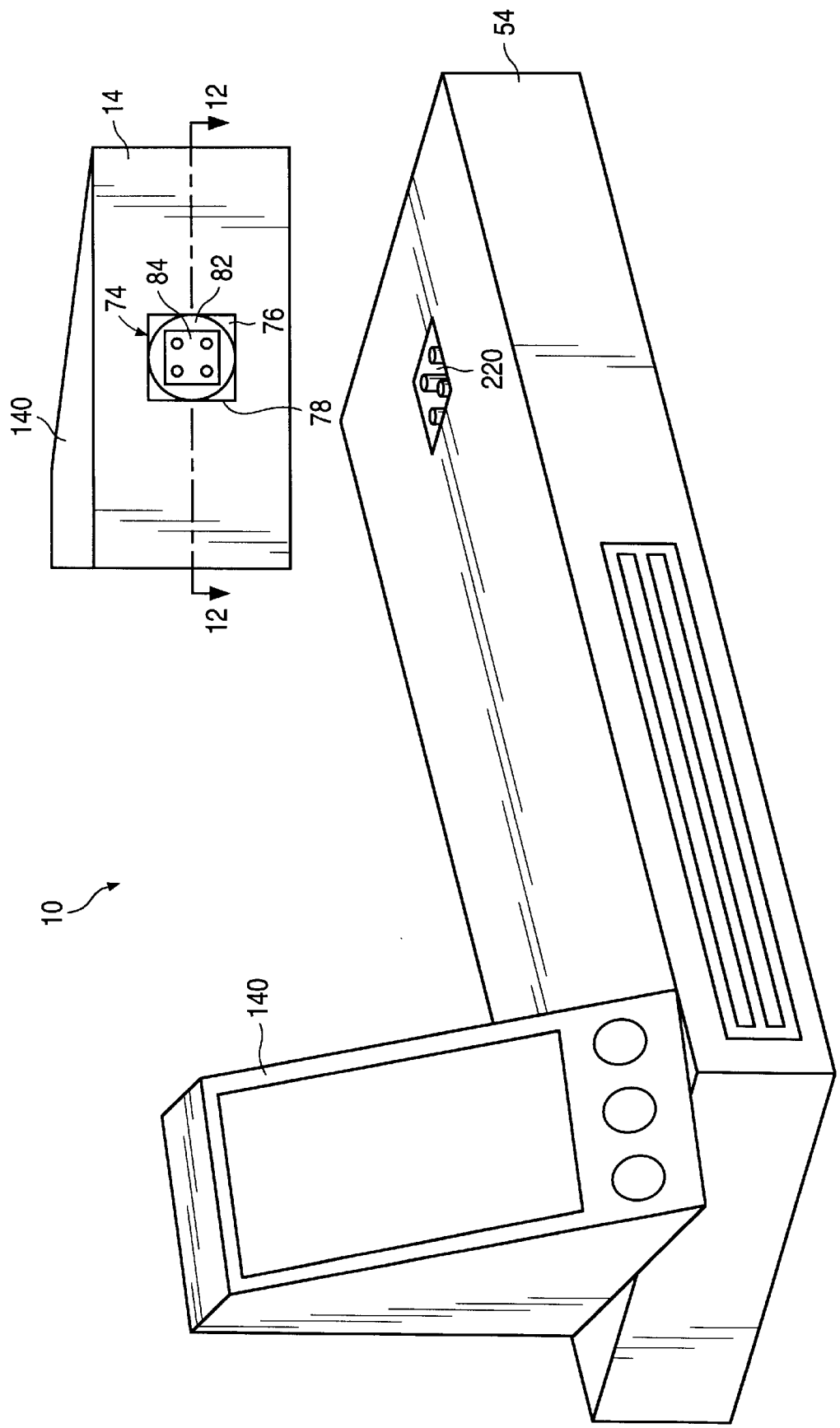
FIG. 11 is an elevated perspective view of a fourth embodiment computer system with a stationary computer mounting structure, a speaker mounting mechanism, and a pair of speakers.
Figure 12:
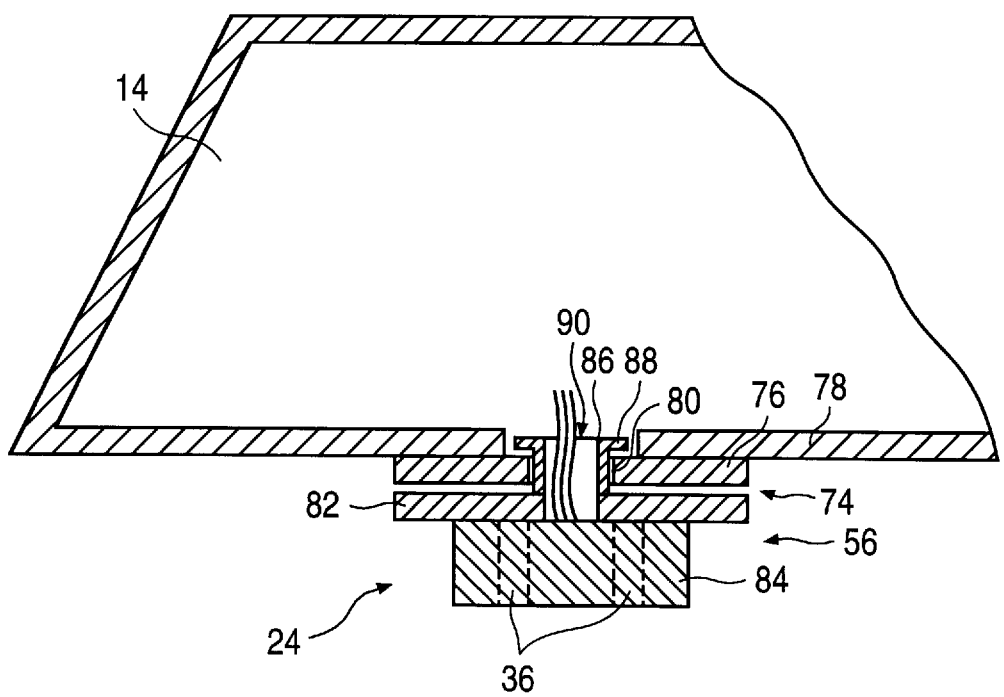
FIG. 12 is a sectional view of a portion of a speaker together with a peripheral connector mechanism provided on the speaker, the view being defined by the viewing plane line 12—12 shown in FIG. 11.

Another example of a speaker pivot mechanism 56 is illustrated in a fourth embodiment computer system 10 shown in FIGS. 11 and 12. The illustrated speaker pivot mechanism 56 is integrally provided as part of a peripheral connector 24. More specifically, a speaker pivot mechanism 56 is shown which comprises a turntable 74. Turntable 74 allows a speaker, when mounted on a docking station serving as a computer component mounting structure, to be moved azimuthally. That is, each speaker 14 may be rotated to change its orientation in an azimuthal fashion. The left speaker 140 is shown as being slightly rotated in a clockwise direction, and is thus out of alignment with docking station 54. FIG. 12 shows turntable 74 in more detail the view provided in FIG. 12 is defined by the view plane line 12—12 shown in FIG. 11. Turntable 74 comprises a turntable rest member 76, which is secured to a bottom speaker panel 78, and a turntable support member 82. Turntable rest member 76 comprises a center cylindrical recess 80. Turntable support member 82 is fixed to box-shaped fitting member 84, and comprises a cylindrical shaft rotatably provided within recess 80. Box-shaped fitting member 84 may be configured as described above with respect to the embodiments of FIGS. 1–3, 7–9, and 10, and thus may comprise a plurality of electrical connect recesses 36.

Cylindrical shaft 86 acts as an axle around which turntable rest 76 may be rotated. Cylindrical shaft 86 is placed within centered cylindrical recess 80 of turntable rest member 76, and may be provided with a flange 88, or some other type of retaining member, for retaining cylindrical member 86 within centered recess 80 of turntable rest member 76. A top surface of turntable support 82 and a bottom surface of turntable rest member 76 are each preferably flat and smooth and thus have a low coefficient of friction therebetween. Accordingly, speaker 14 may be freely rotated around cylindrical shaft 86. Cylindrical shaft 86 is provided with a central opening 90 for allowing wires (or other suitable connecting electrical signal transmitting members) to be coupled to electrical contact recesses 36 at one end and to an appropriate speaker terminal (not shown) at another end located within speaker 14.

Other types of speaker position varying mechanisms may be provided, rather than a pivot mechanism as disclosed in the illustrated embodiments. For example, a swivel-type mechanism may be provided for allowing a speaker position to be varied in a continuous fashion in many different directions.

Figure 14:
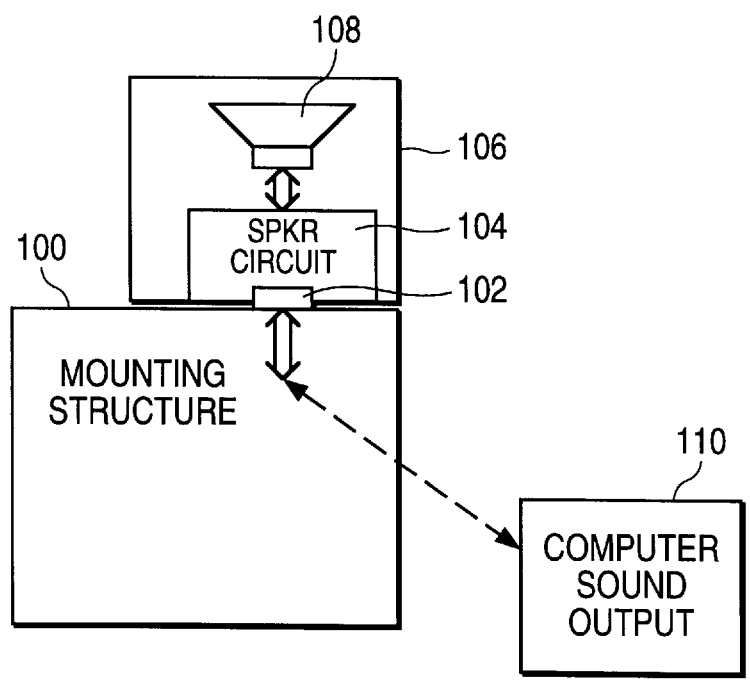
FIG. 14 is a schematic block diagram of a computer system, illustrating the key electrical connections between a speaker and a computer sound output via a computer component mounting structure.

FIG. 14 is a block diagram illustrating the overall electrical and physical connections which may be made between a speaker 108 enclosed within a speaker housing 106, a computer component mounting structure 100, and a computer sound output 110. An electrical connection must be made between computer sound output 110 and electrical terminals of speaker 108, via mounting structure 100. Speaker housing 106 encloses speaker 108, and is mechanically connected to mounting structure 100 via a mounting mechanism 102. Speaker 108 is electrically connected to mounting structure 100. An optional speaker circuit 104 may be interposed between input electrical terminals of speaker 108 and electrical terminals provided within computer component mounting structure 100. Speaker circuit 104 may comprise, for example, filter circuitry and/or a built-in amplifier. Computer sound output 110 may be provided as part of computer component mounting structure 100, or may be provided elsewhere in a computer system, for example, within a tower that houses a motherboard and other components of a stationary-type computer, or within a keyboard/main body of a notebook computer. More specifically, computer sound output 110 may comprise a sound board such as a 16 bit sound card.

Several specific exemplary embodiments of computer system 10 have been illustrated in the various figures. Variations may be made to the exemplary embodiments without departing from the scope of the present invention, which is directed to a computer system having, among others features, an audio speaker assembly apparatus. The audio speaker assembly apparatus includes at least one speaker and a detachable mounting mechanism for electrically and physically connecting the at least one speaker to at least one computer component mounting structure. The specific features disclosed herein may be varied in many respects. For example, each embodiment illustrates a pair of speakers 14 which may be detachably mounted to a computer component mounting structure. The computer component mounting structure may be provided with any number of speaker mounting locations in order to allow less or more speakers to be detachably mounted. For example, the display device 12 illustrated in FIG. 1 may be provided with more than two speaker mounting locations. Specifically, display device 12 could be provided with a third speaker mounting location (not shown) for allowing a third speaker (e.g., a sub-woofer) to be detachably mounted to the same. By providing this additional speaker mounting location, and by detachably mounting a sub-woofer speaker to the assembly, the overall fidelity and sound quality produced by the system can be improved. The resulting system is even more flexible than the system having only two speaker mounting locations as shown in the specifically illustrated embodiments.

Another feature which is shown in the illustrated embodiments is the provision of male electrical contact pins 34 within the computer component mounting structure. By providing electrical contact pins within a box-shaped recess located in a particular panel of a computer component mounting structure, the pins are less likely to be damaged, than if they were provided on the speaker. However, other pin arrangements could be used.

The audio speakers may be commercially available computer speakers of suitable quality. By way of example, the audio assembly apparatus may be provided with both right and left channel speakers. In addition, a woofer-midrange and tweeter may be provided in each speaker in order to provide a more robust frequency response than a full-range speaker might provide. In addition, since sound cards in computer systems typically have low power outputs, on the order of four watts per channel each speaker may be provided with a built-in power amplifier. If the speakers are provided with a built-in power amplifier, each speaker may be provided with its own individual power source such as one or more batteries, or a power input connector may be provided to automatically connect power to each speaker via connector mechanism 20.

Each speaker may be provided with several different control knobs, and input jacks for other audio devices such as a headphones. For example, a headphone jack may be provided within each of the speakers, and each speaker may be provided with separate bass and treble controls, a balance control and a volume control.

It can also be important to ensure that each speaker is equipped with adequate magnetic shielding. Several different mechanisms for shielding speakers for computer use are well known. Typical reasons for magnetically shielding computer speakers are to prevent interference with a monitor and/or a hard disk of a computer. Magnetic shielding may be in the form of insulation and/or circuitry for electronically cancelling out magnetic effects. The computer system should be implemented taking into account any potential EMF (electromagnetic frequency) effects on the quality of sound produced by the speakers. For example, the particular lay-out of a sound card utilized to produce the sounds can be important and can effect the sound quality produced. In addition, the wires leading to the input terminals of each speaker should be provided with sufficient shielding and they should be positioned to minimize cross-talk and other interference effects that affect sound quality.

While the invention has been described with reference to preferred embodiments, it is understood that the words which have been used herein are words of description, rather than words of limitation. Changes made be made, within the purview of the appended claims, without departing from the scope and spirit of the invention in its aspects. Although the invention has been described with reference to particular means, materials, and embodiments, the invention is not intended to be limited to the particular words disclosed herein; rather, the invention extends to all equivalent structure, methods, and uses, such as are within the scope of the appended claims.

What is claimed is:

1. A computer system having a data processing unit, an audio speaker assembly apparatus, and at least one computer component mounting structure, said audio speaker assembly apparatus comprising:

at least one speaker; and mounting means for electrically connecting said at least one speaker to said at least one computer component mounting structure and for concurrently physically supporting said at least one speaker on said at least one computer component mounting structure, said mounting means comprising means for snap mounting said at least one speaker to said at least one computer component mounting structure for selectively and readily establishing both an electrical connection of said at least one speaker to said at least one computer component mounting structure and a physical support of said at least one speaker on said at least one computer component mounting structure.

2. The computer system according to claim 1, wherein said mounting means comprises:

base connector means provided on said at least one computer component mounting structure, said base connector means comprising a base mating structure; and peripheral connector means provided on said at least one speaker, said peripheral connector means comprising a peripheral mating structure complementary to said base mating structure.

3. The computer system according to claim 2, wherein said base connector means and said peripheral connector means collectively comprise means for resting weight of said at least one speaker on said at least one computer component mounting structure.

4. The computer system according to claim 2, wherein said base connector means and said peripheral connector means each comprise complementary electrical contacts arranged to electrically contact each other with matching polarity when said base mating structure is fully mated with said peripheral mating structure.

5. The computer system according to claim 4, wherein said peripheral connector means further includes means for providing the electrical contacts of said peripheral connector means in an arrangement so that the peripheral mating structure is capable of being fully mated with the base mating structure in a plurality of orientations relative to the base mating structure, wherein when the peripheral mating structure and the base mating structure are mated in each orientation, the electrical contacts of the peripheral connector means electrically contact and properly correspond in matching polarity to electrical contacts of said base connector means.

6. The computer system according to claim 5, wherein a first orientation of the plurality of orientations is 180 degrees from a second orientation of the plurality of orientations.

7. The computer system according to claim 2, wherein said at least one computer component mounting structure comprises a plurality of speaker mounting locations, and wherein said base connector means comprises a base connector at each of said speaker mounting locations.

8. The computer system according to claim 7, wherein each base connector comprises a similar mating structure and a similar arrangement of electrical contacts, thereby permitting a speaker having said peripheral connector means to be detachably mounted to any speaker mounting location.

9. The computer system according to claim 2, wherein said at least one computer component mounting structure comprises a single mounting structure having a plurality of speaker mounting locations.

10. The computer system according to claim 9, wherein said single mounting structure comprises a display housing of a portable computer.

11. The computer system according to claim 10, wherein said speaker mounting locations are at each of two lateral sides of said display housing.

12. The computer system according to claim 9, wherein said single mounting structure comprises a stationary mounting structure for housing a computer processing system.

13. The computer system according to claim 12, wherein said stationary mounting structure comprises a docking station for docking portable computers.

14. The computer system according to claim 13, wherein said speaker mounting locations are on a top surface of said docking station.

15. The computer system according to claim 1, wherein said mounting means comprises means for electrically connecting input terminals of said at least one speaker to sound output terminals of a computer and for concurrently mechanically mounting said at least one speaker to said at least one computer component mounting structure.

16. The computer system according to claim 2, wherein said mounting means comprises position varying means for varying a position of each mounted speaker relative to said at least one computer component mounting structure.

17. The computer system according to claim 16, wherein said position varying means comprises means for changing an orientation of a mounted speaker without changing a mounting location of the mounted speaker on said computer component mounting structure.

18. The computer system according to claim 17, wherein said position varying means comprises a hinge.

19. The computer system according to claim 17, wherein said position varying means comprises a turntable.

20. The computer system according to claim 1, wherein said at least one speaker comprises a music-quality speaker.

21. A computer component mounting structure comprising:
mounting means comprising means for electrically connecting at least one speaker to said computer component mounting structure and for concurrently physically supporting said at least one speaker on said computer component mounting structure, and comprising means for snap mounting said at least one speaker to said at least one computer component mounting structure for selectively and readily establishing both an electrical connection of said at least one speaker to said computer component mounting structure and a physical support on said at least one speaker or said computer component mounting structure.

22. An audio speaker comprising:
mounting means comprising means for electrically connecting said audio speaker to a computer component mounting structure and for concurrently physically supporting said audio speaker on said computer component mounting structure, and comprising means for snap mounting said at least one speaker to said at least one computer component mounting structure for selectively and readily establishing both an electrical connection of said audio speaker to said computer component mounting structure and a physical support of said audio speaker on said computer component mounting structure.

23. A computer system comprising:
a processor;
a computer component mounting structure;
a base connector provided on the computer component mounting structure, the base connector having a base mating structure, the base connector having base electrical contacts electrically coupled to a computer system sound output;
a speaker having input terminals;
a peripheral connector provided on the speaker, the peripheral connector having a peripheral mating structure complementary to the base mating structure, the peripheral connector having electrical contacts electrically coupled to the input terminals of the speaker;
wherein the base connector and the peripheral connector are mated to detachably snap mount the speaker to the computer component mounting structure to physically support the audio speaker on the computer component mounting structure and to electrically connect of the peripheral electrical contracts to the base electrical contacts.

24. The computer system of claim 23 wherein the computer system is a portable computer.

25. The computer system of claim 23 wherein the computer mounting structure is a display housing.

26. The computer system of claim 23 wherein the computer mounting structure is a docking station for docking portable computers.

27. The computer system of claim 26 wherein the base mating structure is located on a top surface of the docking station.

28. The computer system of claim 23 wherein:
the peripheral mating structure extends from a panel of the speaker;
the base mating structure defines a recess within the computer component mounting structure; and
the base connector and the peripheral connector are mated by inserting the peripheral mating structure into the recess.

29. The computer system of claim 28 wherein:
the peripheral mating structure is of a box shape member;
the base connector is a box shaped recess.

30. The computer system of claim 28 wherein:
wherein the peripheral mating structure is integrally formed with the panel of the speaker.

31. The computer system of claim 28 wherein the base electrical contacts are contact pins located in the recess.

32. The computer system of claim 23 wherein:
the peripheral electrical contacts are accessible via recesses in the peripheral mating structure.

33. The computer system of claim 23 wherein:
the base electrical contacts are contact pins.

34. The computer system of claim 23 wherein:
the electrical contacts of the peripheral connector and the base connector are each arranged in corresponding patterns of alternating polarity so that the peripheral connector is capable of being fully mated with the base connector in a plurality of orientations relative to the base connector, wherein when the peripheral connector and the base connector are mated in each orientation, the electrical contacts of the peripheral connector electrically contact and properly correspond in matching polarity to the electrical contacts of the base connector.

35. The computer system of claim 34 wherein:
a first orientation of the plurality of orientations is 180 degrees from a second orientation of the plurality of orientations.

36. The computer system of claim 23 wherein:
the base connector further includes a supplemental base mating structure;
the peripheral connector further includes a supplemental peripheral mating structure;
wherein the supplemental base mating structure and the supplemental peripheral mating structure are mated when the base connector and the peripheral connector are mated.

37. The computer system of claim 36 wherein:
the supplemental peripheral mating structure extends from a panel of the speaker;
the supplemental base mating structure defines a recess within the computer component mounting structure;
the supplemental base mating structure and the supplemental peripheral mating structure are mated by inserting the peripheral mating structure into the recess.

38. The computer system of claim 23 further comprising:
a hinge for varying the position of the speaker with respect to the computer component mounting structure when the base connector and the peripheral connector are mated.

39. The computer system of claim 38 further wherein:
the hinge is connected between a panel of the speaker and the peripheral mating structure.

40. The computer system of claim 23 further comprising:
a turntable for varying the position of the speaker with respect to the computer component mounting structure when the base connector and the peripheral connector are mated.

41. The computer system of claim 40 wherein:

the turntable is connected to a panel of the speaker and to the peripheral mating structure, the turntable allowing the position of the speaker to be varied by rotation with respect to the peripheral mating structure.

42. the computer system of claim 23 wherein:

the base connector further including a retention spring for retaining the peripheral mating structure when the base connector and the peripheral connector are mated.

* * * * *